(12) United States Patent
Hayashi et al.

(10) Patent No.: US 8,579,331 B2
(45) Date of Patent: Nov. 12, 2013

(54) TANK HOLDING MECHANISM FOR GAS TANK AND VEHICLE IN WHICH GAS TANK IS MOUNTED USING THE SAME

(75) Inventors: Hidetsugu Hayashi, Toyota (JP); Shusuke Inagi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 62 days.

(21) Appl. No.: 12/986,311

(22) Filed: Jan. 7, 2011

(65) Prior Publication Data
US 2011/0174856 A1 Jul. 21, 2011

(30) Foreign Application Priority Data

Jan. 19, 2010 (JP) ................................ 2010-008849

(51) Int. Cl.
*B60K 15/067* (2006.01)
(52) U.S. Cl.
USPC ......... 280/834; 280/830; 280/784; 248/230.1
(58) Field of Classification Search
USPC ............. 280/834, 830, 784; 248/230.1, 230.8
See application file for complete search history.

(56) References Cited

U.S. PATENT DOCUMENTS

| | | | | |
|---|---|---|---|---|
| 4,919,226 A | * | 4/1990 | Rana et al. ..................... | 180/274 |
| 5,518,272 A | * | 5/1996 | Fukagawa et al. ............. | 280/834 |
| 5,542,707 A | * | 8/1996 | Kamei et al. ................... | 280/834 |
| 5,810,309 A | * | 9/1998 | Augustine et al. ............. | 248/313 |
| 5,992,885 A | * | 11/1999 | Fukagawa et al. ............. | 280/830 |
| 5,997,040 A | * | 12/1999 | Fukagawa et al. ............. | 280/834 |
| 6,042,071 A | * | 3/2000 | Watanabe et al. ............. | 248/313 |
| 6,086,103 A | * | 7/2000 | Fukagawa et al. ............. | 280/830 |
| 6,099,042 A | * | 8/2000 | Cook et al. ..................... | 280/834 |
| 6,672,620 B2 | * | 1/2004 | Kawazu et al. ................ | 280/834 |
| 6,824,168 B2 | * | 11/2004 | Kawazu et al. ................ | 280/834 |
| 6,953,099 B2 | * | 10/2005 | Kawasaki et al. ............. | 180/65.1 |

(Continued)

FOREIGN PATENT DOCUMENTS

| | | |
|---|---|---|
| DE | 196 23 844 | 1/1997 |
| DE | 103 55 709 | 7/2005 |

(Continued)

OTHER PUBLICATIONS

German Office Action for German Appl. No. 10 2010 061 635.4-21 dated May 11, 2012.

*Primary Examiner* — Kevin Hurley
*Assistant Examiner* — Michael Stabley
(74) *Attorney, Agent, or Firm* — Finnegan, Henderson, Farabow, Garrett & Dunner, LLP

(57) ABSTRACT

A tank holding mechanism holds a gas tank that has a cylindrical portion and hemispherical-shaped domical portions formed on respective sides of the cylindrical portion. The tank holding mechanism includes: a tank accommodating portion that contacts a peripheral wall of the cylindrical portion of the gas tank; tank end-side members provided near respective ends of the gas tank; a tank band that pushes the gas tank against the tank accommodating portion; and band securing portions that secure end portions of the tank band to the respective tank end-side members. The tank band is routed from one of the domical portions through the cylindrical portion to the other domical portion. The tank band extends along a diagonal line of the gas tank over an outer face of the cylindrical portion, conforms to the outer face of the cylindrical portion, and conforms to hemispherical outer faces of both of the domical portions.

9 Claims, 7 Drawing Sheets

(56) References Cited

U.S. PATENT DOCUMENTS

| | | | |
|---|---|---|---|
| 6,983,945 B2* | 1/2006 | Kawasaki et al. | 280/834 |
| 7,198,301 B2* | 4/2007 | Wozniak et al. | 280/830 |
| 7,264,277 B2* | 9/2007 | Ono et al. | 280/830 |
| 7,819,431 B2* | 10/2010 | Minami | 280/834 |
| 2003/0042057 A1* | 3/2003 | Kawazu et al. | 180/69.4 |
| 2003/0047932 A1* | 3/2003 | Kawazu et al. | 280/830 |
| 2004/0239095 A1* | 12/2004 | Wozniak et al. | 280/834 |
| 2005/0161935 A1* | 7/2005 | Ono et al. | 280/834 |
| 2010/0045018 A1 | 2/2010 | Kondo et al. | |

FOREIGN PATENT DOCUMENTS

| | | |
|---|---|---|
| JP | 2001-163067 | 6/2001 |
| JP | 2003-291666 | 10/2003 |
| JP | 2009-214782 | 9/2009 |
| WO | WO 2009/099249 | 8/2009 |

* cited by examiner

US 8,579,331 B2

TANK HOLDING MECHANISM FOR GAS TANK AND VEHICLE IN WHICH GAS TANK IS MOUNTED USING THE SAME

INCORPORATION BY REFERENCE

The disclosure of Japanese Patent Application No. 2010-008849 filed on Jan. 19, 2010 including the specification, drawings and abstract is incorporated herein by reference in its entirety.

BACKGROUND OF THE INVENTION

1. Field of the Invention

The invention relates to a tank holding mechanism that holds a gas tank, and a vehicle in which a gas tank is mounted using the same.

2. Description of the Related Art

In recent years, mounting a high-pressure gas tank (hereinafter, referred to as "HP gas tank") in a vehicle has become increasingly common. For example, Japanese Patent Application Publication No. 2003-291666 (JP-A-2003-291666) describes a fuel-cell vehicle provided with a HP gas tank that stores hydrogen gas used as fuel gas for a fuel cell. The HP gas tank is transversely mounted in the vehicle.

According to JP-A-2003-291666, multiple bands are wound around a cylindrical portion of the HP gas tank to hold the HP gas tank. Therefore, even if a force is applied to an outer face of the cylindrical portion of the HP gas tank, the bands keep holding the HP gas tank in an appropriate position against the force. The bands are wound around the outer face of the cylindrical portion. In this arrangement, the holding force of these bands needs to be sufficient to keep holding the HP gas tank in an appropriate position even if an axial force is applied to the HP gas tank. Meanwhile, reduction in the wall thickness of a HP gas tank is now in increasing demand to achieve weight reduction of the HP gas tank. As the wall thickness is reduced, however, it is not possible to further increase the holding force of the bands.

SUMMARY OF THE INVENTION

The invention provides a tank holding mechanism for a gas tank, which keeps holding a gas tank in an appropriate position more reliably even if an axial force is applied to the gas tank, and a vehicle in which a gas tank is mounted using the same.

An aspect of the invention relates to a tank holding mechanism for holding a gas tank that has a cylindrical portion and hemispherical-shaped domical portions formed on respective sides of the cylindrical portion. The tank holding mechanism includes: 1) a tank accommodating portion that contacts a peripheral wall of the cylindrical portion of the gas tank; 2) tank end-side members that are provided near respective ends of the gas tank; 3) at least one tank band that pushes the gas tank against the tank accommodating portion; and 4) band securing portions that secure end portions of the tank band to the respective tank end-side members. The tank band is routed from one of the domical portions through the cylindrical portion to the other domical portion. The tank band extends along a diagonal line of the gas tank on an outer face of the cylindrical portion, conforms to the outer face of the cylindrical portion, and conforms to hemispherical outer faces of both of the domical portions.

In the thus structured tank holding mechanism, the peripheral wall of the cylindrical portion of the gas tank that has been brought into contact with the tank accommodating portion is held by the tank band, and the tank end-side members to which the tank band is secured are provided near respective ends of the gas tank. Therefore, the tank band, which is secured to one of the tank end-side members by the band securing portion, is routed from one of the domical portions toward the cylindrical portion and conforms to the hemispherical outer face of the domical portion. Similarly, the tank band, which is secured to the other tank end-side member, is routed from the other domical portion toward the cylindrical portion and conforms to the hemispherical outer face of the other domical portion. The tank band extends along the diagonal line of the gas tank on the outer face of the cylindrical portion, and conforms to the outer face of the cylindrical portion. The tank band is routed from one of the domical portions through the cylindrical portion to the other domical portion. The thus routed tank band pushes the gas tank against the tank accommodating portion to hold the gas tank. With the thus structured tank holding mechanism that includes the tank band that is looped diagonally across the gas tank, even if an axial force is applied to the gas tank, the axial force may be borne by a portion of the tank band, which conforms to the hemispherical outer face of the domical portion to which the applied force is transmitted. Accordingly, it is possible to more reliably keep holding the gas tank in an appropriate position even if an axial force is applied to the gas tank. If a force directed downward is applied to the outer face of the cylindrical portion, the force may be borne by a portion of the tank band, which extends diagonally across the cylindrical portion and conforms to the outer face of the cylindrical portion. Accordingly, it is also possible to keep holding the gas tank in an appropriate position against the force. In addition, it is possible to keep holding the gas tank in an appropriate position more reliably without excessively increasing the holding force of the tank band. Therefore, it may not be necessary to excessively increase the strength of the tank band, and it may be possible to reduce the cost of the tank band.

In the tank holding mechanism described above, the tank band may be routed from one of the domical portions through the cylindrical portion to the other domical portion along the direction of fibers that are helically wound around the gas tank, for example, by a filament winding method to reinforce the gas tank. With this arrangement, the tank band may more reliably conforms to the hemispherical outer faces of the domical portions. Therefore, it may be possible to more reliably keep holding the gas tank in an appropriate position even if an axial force is applied to the gas tank.

In the tank holding mechanism described above, the number of the tank bands may be two. The two tank bands may cross each other on the outer face of the cylindrical portion, and the tank bands may be secured to the tank end-side members by the band securing portions. With this arrangement, it may be possible to more reliably keep holding the gas tank in an appropriate position even if an axial force is applied to the gas tank. In addition, providing two tank bands may not hinder space saving.

In the tank holding mechanism described above, at least one of the band securing portions positioned at respective ends of the tank band may secure the corresponding end of the tank band to the corresponding tank end-side member while absorbing a force that acts to expand the tank band. With this arrangement, even if the gas tank held by the tank holding mechanism expands or compresses in the radial direction or axial direction of the gas tank, it may be possible to absorb the expansion or compression of the gas tank and keep holding the gas tank in an appropriate position.

Another aspect of the invention relates to a vehicle that includes: a gas tank that is transversely mounted in such a manner that the longitudinal direction of the gas tank substantially coincides with the lateral direction of the vehicle; and the tank holding mechanism according to the above-described aspect. The tank accommodating portion of the tank holding mechanism is positioned over the gas tank in the vehicle-height direction.

In the vehicle, it is possible to transversely mount the gas tank under a vehicle floor, and keep holding the gas tank in an appropriate position more reliably even if an axial force is applied to the gas tank.

BRIEF DESCRIPTION OF THE DRAWINGS

Features, advantages, and technical and industrial significance of this invention will be described in the following detailed description of exemplary embodiments of the invention with reference to the accompanying drawings, in which like numerals denote like elements, and wherein.

DETAILED DESCRIPTION OF EXEMPLARY EMBODIMENTS

Figure 1:
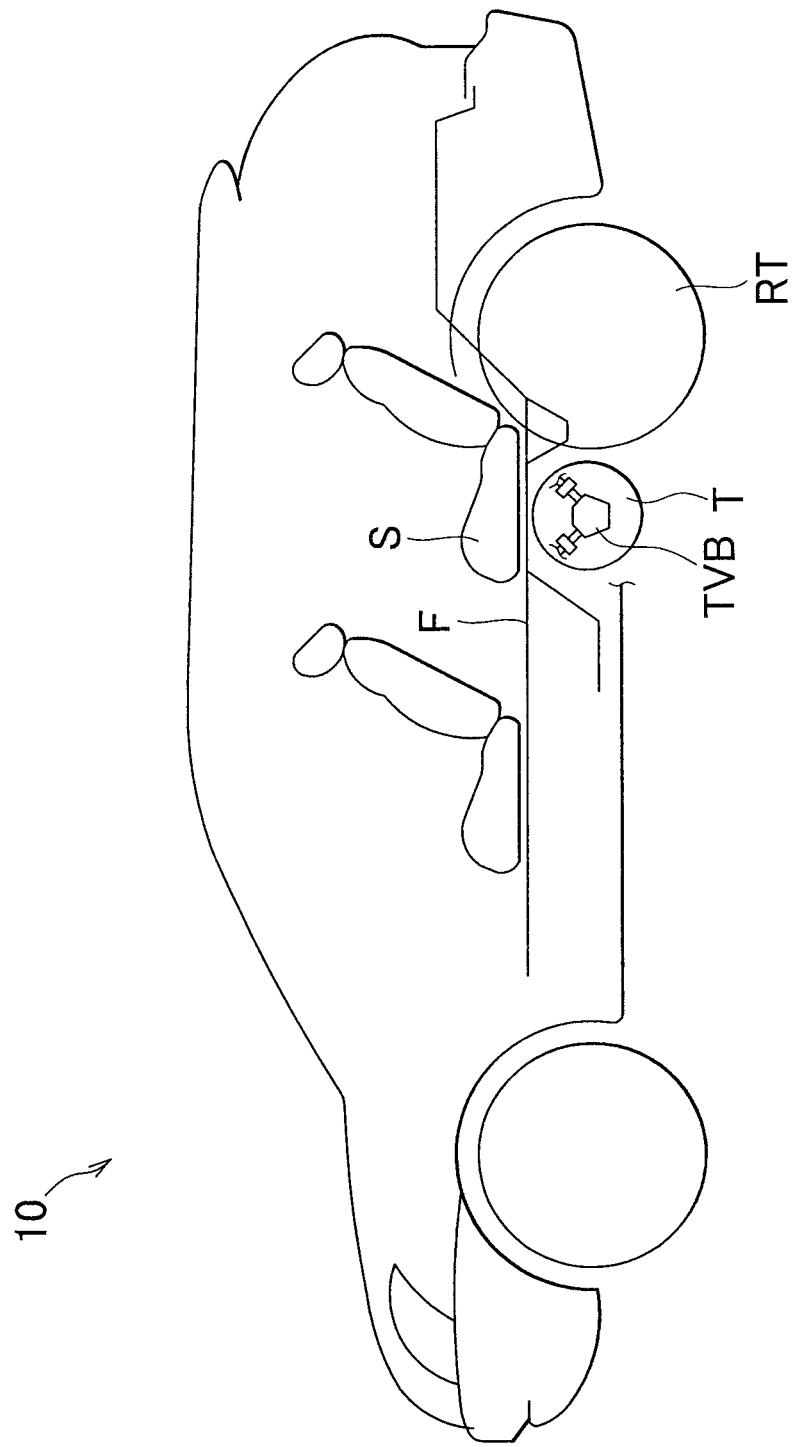
FIG. 1 is a view schematically showing the state where a high-pressure gas tank (hereinafter, referred to as "HP gas tank") is mounted in a vehicle with the use of a tank holding mechanism according to an embodiment of the invention.
Figure 2:
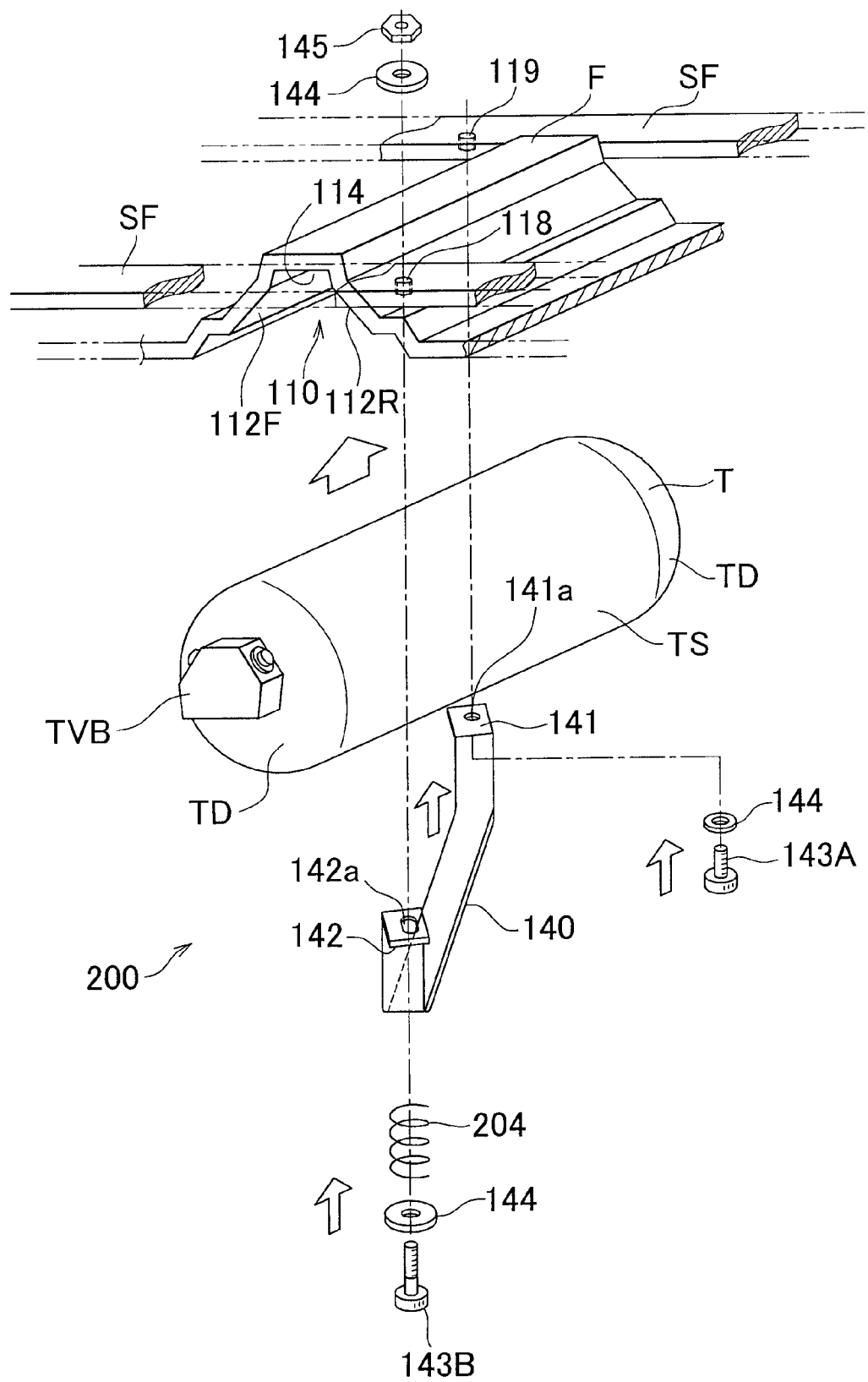
FIG. 2 is an exploded view showing the manner in which the HP gas tank is mounted in the vehicle, and showing structures near the HP gas tank.
Figure 3:
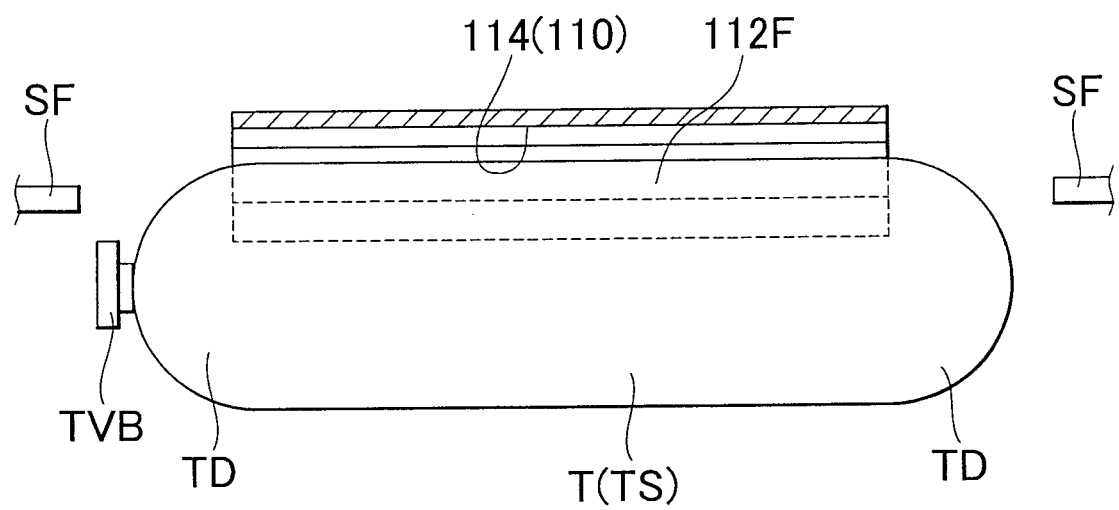
FIG. 3 is a view schematically showing the positional relationship between the HP gas tank and a vehicle-side frame near the HP gas tank along the longitudinal direction of the HP gas tank.
Figure 4:
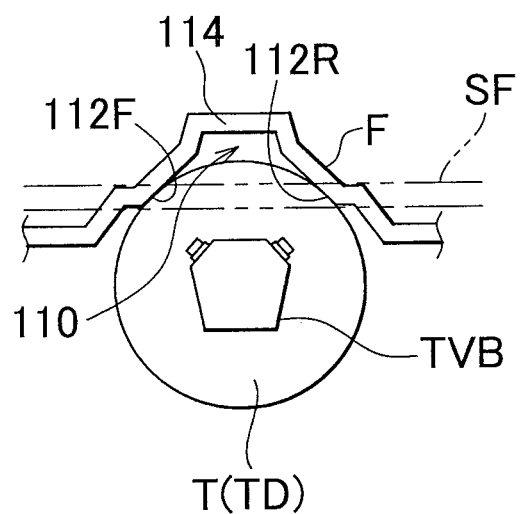
FIG. 4 is a view schematically showing the positional relationship between the HP gas tank and the vehicle-side frame near the HP gas tank, viewed from an axial end portion of the HP gas tank.

Hereafter, exemplary embodiments of the invention will be described with reference to the accompanying drawings. FIG. 1 is a view schematically showing the state where a high-pressure gas tank (hereinafter, referred to as "HP gas tank") T is mounted in a vehicle 10 with the use of a tank holding mechanism according to an embodiment of the invention. FIG. 2 is an exploded view showing the manner in which the HP gas tank T is mounted in the vehicle 10, and showing structures near the HP gas tank T. FIG. 3 is a view schematically showing the positional relationship between the HP gas tank T and a vehicle-side frame near the HP gas tank T along the longitudinal direction of the HP gas tank T. FIG. 4 is a view schematically showing the positional relationship between the HP gas tank T and the vehicle-side frame near the HP gas tank T, viewed from an axial end portion of the HP gas tank T.

As shown in FIG. 1, in the vehicle 10, the HP gas tank T is transversely mounted under a platform F (tank accommodating portion) in such a manner that the longitudinal direction of the HP gas tank T substantially coincides with the lateral direction of the vehicle 10. The HP gas tank T stores a gas, such as, e.g., hydrogen gas, at high pressure. The hydrogen gas is supplied from the HP gas tank T to a fuel cell (not shown) mounted in the vehicle 10 through a gas pipe (not shown). Before the hydrogen gas is supplied to the fuel cell, the pressure of the hydrogen gas is reduced by a pressure reduction valve (not shown). The HP gas tank T is transversely mounted under a rear passenger seat S. At least one more HP gas tank T may be transversely mounted next to the above-described HP gas tank T in the direction that is perpendicular to the sheet on which FIG. 1 is drawn and that is away from the reader. The position at which the HP gas tank T is mounted is not limited to the above-described position. For example, the HP gas tank T may be transversely mounted behind an axle for rear wheels RT.

The HP gas tank T is a fiber-reinforced tank having a reinforced resin liner (not shown). The liner is reinforced by fibers that are wound around the outer periphery of the liner in a filament winding method. As shown in FIG. 2, the HP gas tank T is formed by bonding domical portions TD, each of which has a hemispherical shape, to respective sides of a long cylindrical portion TS. Each of the domical portions TD has an outer face that is an isotonic curved surface. A metal valve base TVB is attached to one of the domical portions TD. A passage for hydrogen gas stored in the HP gas tank T is formed in the valve base TVB. The valve base TVB is connected to a gas pipe via a pipe connector provided on the side face.

In the vehicle 10 according to the embodiment shown in FIGS. 1-4, a tank housing recess 110 is formed under the bottom face of the platform F arranged below the rear passenger seat S. The tank housing recess 110 extends in the lateral direction of the vehicle 10. As will be described later in detail, the HP gas tank T is housed in the tank housing recess 110 and held by a tank holding mechanism 200 that includes a tank band 140 looped diagonally across the HP gas tank T. The tank housing recess 110 is defined by a front securing seat 112F and a rear securing seat 112R that are formed in a front inclined face and a rear inclined face, respectively. The front inclined face and the rear inclined face extend in the lateral direction of the vehicle 10, and face each other in the longitudinal direction of the vehicle 10. A groove 114 that extends in the lateral direction of the vehicle 10 is formed between these inclined faces. The front securing seat 112F and the rear securing seat 112R, which face each other across the groove 114, contact two respective portions of the peripheral wall of the HP gas tank T along the longitudinal direction of the HP gas tank T, as shown in FIG. 4. When the HP gas tank T is brought into contact with the front securing seat 112F and the rear securing seat 112R, the transversely mounted HP gas tank T is received and held by the two securing seats 112F and 112R. In this way, the position of the HP gas tank T in the radial direction is maintained. In this case, the two securing seats 112F and 112R are positioned over the HP gas tank T mounted in the vehicle 10. Therefore, the position of the HP gas tank T in the vehicle-height direction and in the longitudinal direction of the vehicle 10 is maintained when the HP gas tank T is brought into contact with the two securing seats 112F and 112R. The position of the HP gas tank T in the rotational direction is maintained, for example, with the use of the valve base TVB, in any desired manner.

In the vehicle 10, side frames SF (tank end-side members) are provided on respective sides of the platform F. As shown in FIGS. 2 to 4, the side frames SF are provided at positions near respective ends of the HP gas tank T and above an axis AX (see FIG. 5B) of the HP gas tank T. One of the side frames SF has a through-hole 118, and the other side frame SF has an internal screw hole 119. The through-hole 118 is formed in the side frame SF that is located near one end of the HP gas tank T. The through-hole 118 is formed at a position near the rear securing seat 112R. The internal screw hole 119 is formed in the side frame SF that is located near the other end of the HP gas tank T. The internal screw hole 119 is formed at a position near the front securing seat 112F. The through-hole 118 and the internal screw hole 119 are used to secure the tank band 140, which will be described later in detail, to the side frames SF.

As shown in FIG. 2, the tank holding mechanism 200 includes the tank band 140 used to hold the HP gas tank T. The tank band 140 may be made of any appropriate material, such as, e.g., steel. The tank band 140 has a first secured end 141 and a second secured end 142. The first secured end 141 has a through-hole 141a, and the second secured end 142 has a through-hole 142a. The through-hole 141a is a circular through-hole having a diameter larger than the diameter of a bolt 143A. The through-hole 142a is an elongated hole in a capsule shape. A bolt 143A screwed into the internal screw hole 119 of the side frame SF secures the tank band 140 at the first secured end 141 to the side frame SF. (Rather than screwing the bolt 143A into the threaded internal screw hole 119, the internal screw hole 119 may be formed as a through-hole, and the bolt 143A may be tightened with the use of a nut (not shown), as in the case where the second secured end 142 is secured to the side frame SF as described later in detail.) The second secured end 142 of the tank band 140 is secured to the side frame SF by a long bolt 143B with a coil spring 204 interposed between the second secured end 142 and the bolt 143B. In the embodiment shown in FIG. 2, each of the bolts 143A and 143B has a head with a hexagon-shaped internal socket, but other alternatives may be used, such as, e.g., a head with a hexagon-shaped outer surface. A plain washer 144 (and optionally also a split washer (not shown)) is interposed between the side frame SF and each of the bolts 143A and 143B. The first secured end 141 and the second secured end 142 are formed by bending respective end portions of the tank band 140. The first secured end 141 and the second secured end 142 may have multilayer structure so that sufficient strength of the first and second secured ends 141 and 142 is ensured. Alternatively, the first secured end 141 and the second secured end 142 may be reinforced by ribs (not shown) so that the bent-shape is maintained. Although the bolts 143A and 143B, the plain washers 144, and the coil spring 204 provide band securing portions in the embodiment shown in FIG. 2, alternative band securing portions (not shown) may be used.

Figure 5A:
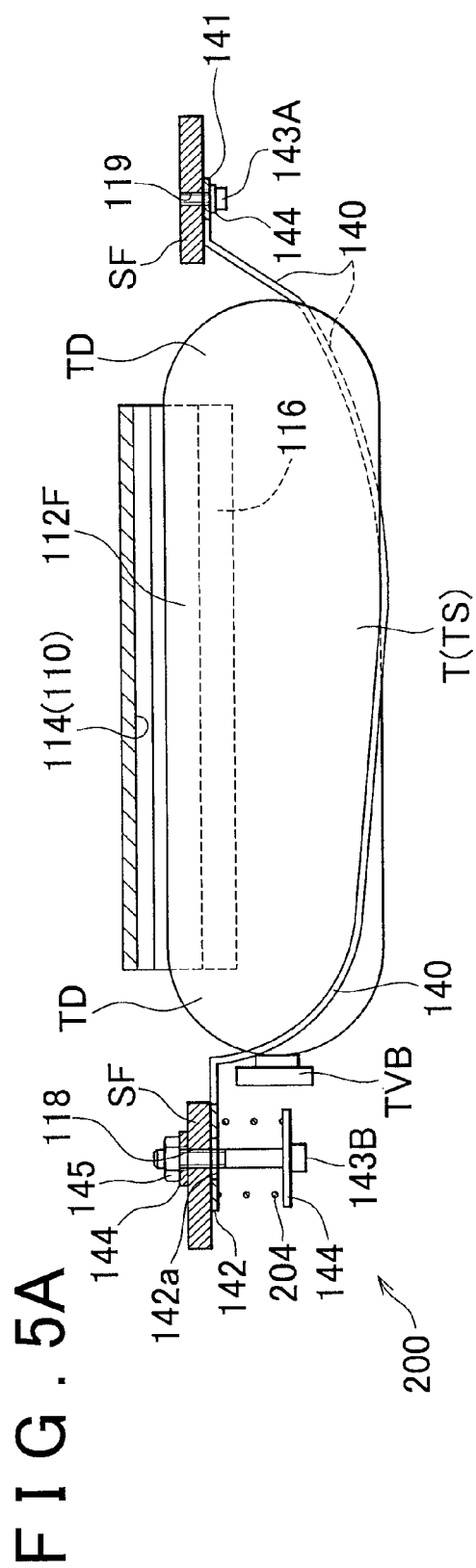
FIG. 5A is a view showing the manner in which a tank band is looped across the HP gas tank and the manner in which the HP gas tank is held by the tank holding mechanism, viewed from the rear of the vehicle in the longitudinal direction of the vehicle.
Figure 5B:
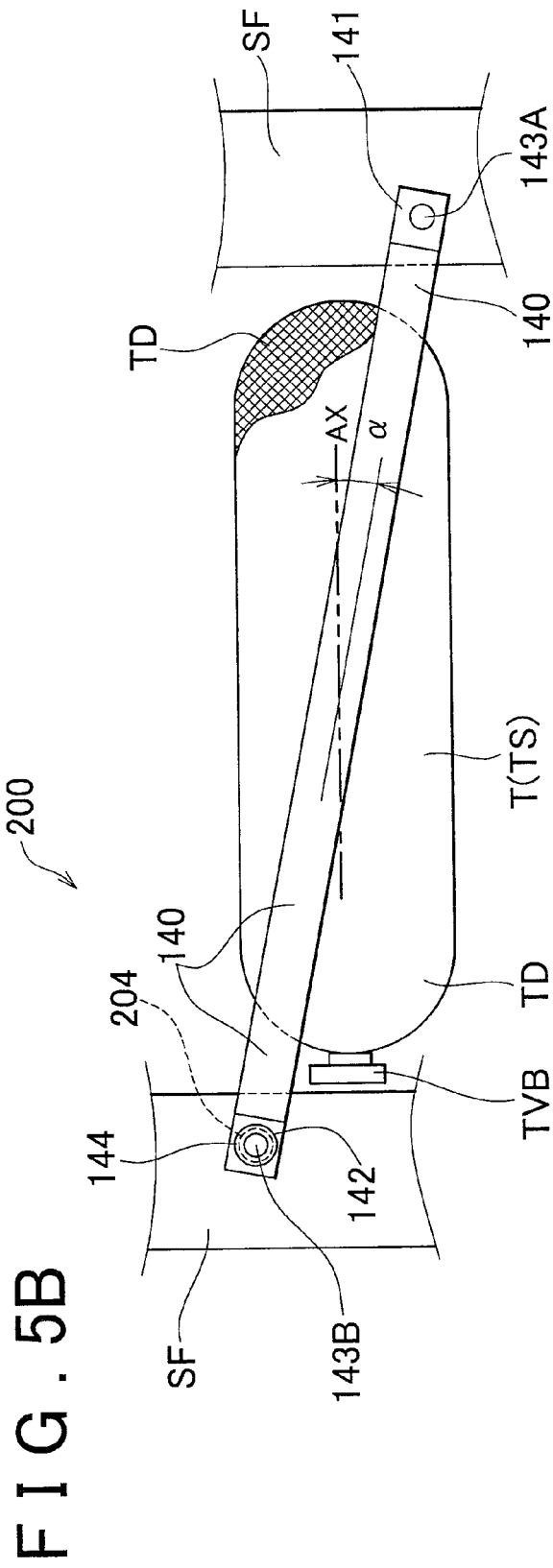
FIG. 5B is a view showing the manner in which the tank band is looped across the HP gas tank and the manner in which the HP gas tank is held by the tank holding mechanism, viewed from under the HP gas tank.
Figure 6A:
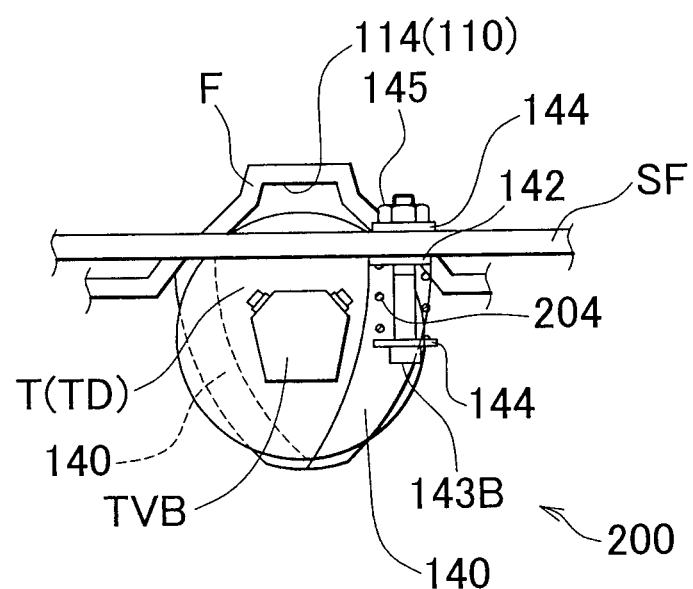
FIG. 6A is a view showing the manner in which the tank band is looped across the HP gas tank and the manner in which the HP gas tank is held by the tank holding mechanism, viewed from the left side of the HP gas tank.
Figure 6B:
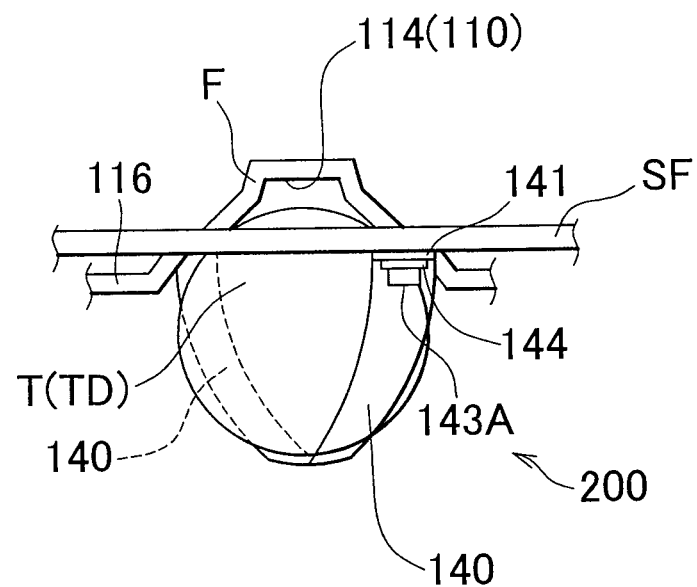
FIG. 6B is a view showing the manner in which the tank band is looped across the HP gas tank and the manner in which the HP gas tank is held by the tank holding mechanism, viewed from the right side of the HP gas tank.

Next, the manner in which the tank band 140 is looped across the HP gas tank T, and the manner in which the HP gas tank T is held by the tank holding mechanism will be described. FIG. 5A is a view showing the manner in which the tank band 140 is looped across the HP gas tank T and the manner in which the HP gas tank T is held by the tank holding mechanism, viewed from the rear of the vehicle 10 in the longitudinal direction of the vehicle 10. FIG. 5B is a view showing the manner in which the tank band 140 is looped across the HP gas tank T and the manner in which the HP gas tank is held by the tank holding mechanism, viewed from under the HP gas tank T. FIG. 6A is a view showing the manner in which the tank band 140 is looped across the HP gas tank T and the manner in which the HP gas tank T is held by the tank holding mechanism, viewed from the left side of the HP gas tank T. FIG. 6B is a view showing the manner in which the tank band 140 is looped across the HP gas tank T and the manner in which the HP gas tank T is held by the tank holding mechanism, viewed from the right side of the HP gas tank T.

As shown in FIGS. 5A, 5B, 6A and 6B, the through-hole 118 and the internal screw hole 119 are formed in the side frames SF to which the respective ends of the tank band 140 are secured. Further, the through-hole 118 and the internal screw hole 119 are positioned near the rear securing seat 112R and the front securing seat 112F, respectively, which contact the peripheral wall of the HP gas tank T. Therefore, the tank band 140 is secured at the first secured end 141 to the bottom face of one of the side frames SF, extends from the bottom face of the side frame SF, extends over and conforms to the outer face of one of the domical portions TD of the HP gas tank T, which is an isotonic curved surface, and extends across the cylindrical portion TS of the HP gas tank T. In the meantime, the tank band 140 is secured at the second secured end 142 to the bottom face of the other side frame SF, extends from the bottom face of the side frame SF, extends over and conforms to the outer face of the other domical portion TD of the HP gas tank T, which is an isotonic curved surface, and extends across the cylindrical portion TS of the HP gas tank T. As shown in the bottom view in FIG. 5B, the first secured end 141 and the second secured end 142 are diagonally opposite to each other with respect to the axis AX of the HP gas tank T. Therefore, the tank band 140 diagonally extends across the cylindrical portion TS of the HP gas tank T and conforms to the outer face of the cylindrical portion TS so that that the tank band 140 intersects with the axis AX when viewed in the view of FIG. 5B. More specifically, the tank band 140 is looped diagonally across the HP gas tank T so as to be routed from one of the domical portions TD through the cylindrical portion TS to the other domical portion TD. With this arrangement, the HP gas tank T is pushed against the front securing seat 112F and the rear securing seat 112R that define the tank housing recess 110. As a result, the HP gas tank T is held by the tank holding mechanism 200.

The tank band 140 conforms to the outer faces of the domical portions TD and the outer face of the cylindrical portion TS. This tank band 140 is looped diagonally across the HP gas tank T in such a manner that an angle α that is formed between the axis AX and the tank band 140 at the cylindrical portion TS is a relatively small value. The tank band 140 is routed from one of the domical portions TD through the cylindrical portion TS to the other domical portion TD along the direction of reinforcement fibers, shown as cross hatching area in FIG. 5B, that are helically wound around HP gas tank T by a filament winding method to reinforce the HP gas tank T. Then, the tank band 140 extends to the side frames SF away from the outer face of the domical portions TD, and is secured at respective ends to the side frames SF. In order to clearly indicate that the side frames SF are kept away from the domical portions TS of the HP gas tank T, the side frames SF are positioned at long distance from the domical portions TD of the HP gas tank T in FIGS. 5A and 5B. However, the side frames SF may be arranged at positions closer to the domical portions TD as long as the side frames SF do not contact the domical portions TD. The side frames SF can be positioned closer to the domical portions TD because the side frames SF are positioned above the axis AX of the HP gas tank T. In this way, it is possible to save the space near the domical portions TD.

Before the HP gas tank T is mounted in the vehicle 10, first, the tank band 140 is removed from the side frames SF so as not to contact the HP gas tank T. Then, the HP gas tank T is conveyed to a position under the tank housing recess 110, as shown in FIG. 2, together with a tank lifter (not shown) that lifts the transversely placed HP gas tank T vertically upward (in addition to lowering it downward if needed). Then, the tank lifter lifts the HP gas tank T up toward the tank housing recess 110. The tank lifter keeps lifting the HP gas tank T up until the peripheral wall of the HP gas tank T contacts the front securing seat 112F and the rear securing seat 112R that define the tank housing recess 110 and that face each other. Before or after the tank lifter lifts the HP gas tank T up to bring the HP gas tank T into contact with the securing seats 112F and 112R, the position of the HP gas tank T in the rotational direction is determined.

Next, the first secured end 141 and the second secured end 142 of the tank band 140 are secured to the side frames SF with bolts 143A and 143B. More specific description will be provided below. The tank band 140 that has been kept away from the HP gas tank T is secured, for example, at the first secured end 141 to the side frame SF with the bolt 143A. Then, the tank band 140 is looped diagonally across the outer periphery of the HP gas tank T in such a manner that the tank band 140 conforms to the domical portion TD on the first secured end 141-side and the outer face of the cylindrical portion TS. Finally, the tank band 140 is secured at the second secured end 142 to the side frame SF with the bolt 143B. At the first secured end 141, the bolt 143A is screwed into the internal screw hole 119 of the side frame SF to directly secure the first secured end 141 to the side frame SF, as shown in FIGS. 5A and 5B. At the second secured end 142, the coil spring 204 is interposed between the second secured end 142 and the large-diameter plain washer 144 placed on the head of the bolt 143B. In this state, the bolt 143B is inserted into the through-hole 142a of the second secured end 142 and the through-hole 118 of the side frame SF, and the bolt 143B is fixed by the nut 145. In order to prevent loosening of the bolt 143B, a so-called double-nut arrangement (not shown) may be employed in fixing the bolt 143B by the nut 145. When nut 145 is screwed to the bolt 143B, the bolt 143B compresses the coil spring 204 via the plain washer 144. The thus compressed coil spring 204 pushes the second secured end 142 of the tank band 140 against the side frame SF to hold the tank band 140 while applying tension to the tank band 140. The HP gas tank T is pushed against the front securing seat 112F and the rear securing seat 112R by the thus held tank band 140. As a result, the HP gas tank T is secured to the platform F.

In the vehicle 10 according to the embodiment described above, in order to hold the HP gas tank T at the front securing seat 112F and the rear securing seat 112R, which define the tank housing recess 110, with the use of the tank holding mechanism 200, the first secured end 141 and the second secured end 142 of the tank band 140 are secured to the side frames SF at the positions of the internal screw hole 119 and the through-hole 118. The internal screw hole 119 and the through-hole 118 are near the front securing seat 112F and the rear securing seat 112R, respectively. Therefore, as described above, the tank band 140 is secured at the first secured end 141 to the bottom face of one of the side frames SF, extends from the bottom face of the side frame SF, extends over and conforms to the outer face of one of the domical portions TD of the HP gas tank T, which is an isotonic curved surface, and extends across the cylindrical portion TS of the HP gas tank T. In the meantime, the tank band 140 is secured at the second secured end 142 to the bottom face of the other side frame SF, extends from the bottom face of the side frame SF, extends over and conforms to the outer face of the other domical portion TD of the HP gas tank T, which is an isotonic curved surface, and extends across the cylindrical portion TS of the HP gas tank T. As shown in the bottom view in FIG. 5B, the tank band 140 diagonally extends across the cylindrical portion TS of the HP gas tank T and conforms to the outer face of the cylindrical portion TS so that that the tank band 140 intersects with the axis AX. More specifically, the tank band 140 is looped diagonally across the HP gas tank T so as to be routed from one of the domical portions TD through the cylindrical portion TS to the other domical portion TD. With this arrangement, the HP gas tank T is pushed against the front securing seat 112F and the rear securing seat 112R that define the tank housing recess 110. As a result, the HP gas tank T is held by the tank holding mechanism 200.

As a result, in the vehicle 10 according to the illustrated embodiment, even if an axial force is applied to the HP gas tank T, the axial force is borne by a portion of the tank band 140, which conforms to the outer face of the domical portion TD to which the force is transmitted. The outer face of the domical portion TD is an isotonic curved surface. Accordingly, it is possible to more reliably keep holding the HP gas tank T in an appropriate position even if an axial force is applied to the HP gas tank T. If a force directed downward in FIGS. 6A and 6B is applied to the outer face of the cylindrical portion TS, the force is borne by a portion of the tank band 140, which extends diagonally across the cylindrical portion TS and conforms to the outer face of the cylindrical portion TS. Accordingly, it is also possible to keep holding the HP gas tank T in an appropriate position against the force. If a force directed in the lateral direction in FIGS. 6A and 6B (in the longitudinal direction of the vehicle 10) is applied to the outer face of the cylindrical portion TS, the force is borne by the front securing seat 112F or the rear securing seat 112R, to which the force is transmitted, and a portion of the tank band 140 that conforms to the domical portion TD. Accordingly, it is also possible to keep holding the HP gas tank T in an appropriate position against the force. In addition, it is possible to hold the HP gas tank T more reliably in an appropriate position without further increasing the holding force of the tank band 140. Therefore, it is not necessary to excessively increase the strength of the tank band 140, and it is possible to reduce the cost of the tank band 140. This also allows there to be a reduction of the wall thickness of the HP gas tank T. As a result, even a thin HP gas tank T may be appropriately mounted in the vehicle 10.

In addition, in the vehicle 10 according to the illustrated embodiment, the tank band 140 is routed from one of the domical portions TD through the cylindrical portion TS to the other domical portion TD of the HP gas tank T along the direction of reinforcement fibers that are helically wound around HP gas tank T by a filament winding method to reinforce the HP gas tank T. Therefore, based on the network theory in the filament winding method, the tank band 140 extends along the geodesic line of the isotonic curved surface of the domical portion TD so as to reliably conform to the outer face of the domical portion TD. As a result, it is possible to more reliably keep holding the HP gas tank T in an appropriate position even if an axial force is applied to the HP gas tank T.

In the tank holding mechanism 200 according to the illustrated embodiment, the coil spring 204 applies a tension to the tank band 140, which is routed from one of the domical portions TD through the cylindrical portion TS to the other domical portion TD of the HP gas tank T as described above, to hold the tank band 130, and the coil spring 204 is compressed. The coil spring 204 is compressed in the state where the coil spring 204 is allowed to be further extended or compressed. Therefore, even if the diameter of the HP gas tank T is changed under the influence of the outside temperature or due to consumption of the high-pressure gas in the HP gas tank T or introduction of the high-pressure gas into the HP gas tank T, the change in the diameter is absorbed. Further, the tank band 140 is looped across the HP gas tank T in such a manner that the tank band 140 conforms not only to the cylindrical portion TS but also to the isotonic curved surfaces of the domical portions TD formed on the respective sides of the cylindrical portion TS. Therefore, expansion or compression of the HP gas tank T in the axial direction is absorbed by a change in the spring length of the coil spring 204. Therefore, in the vehicle 10 according to the illustrated embodiment, it is possible to appropriately mount and hold the HP gas tank T transversely after taking into account possible changes in the diameter and length of the HP gas tank T. In other words, with the tank holding mechanism 200 according to the illustrated embodiment, it is possible to transversely mount the HP gas tank T in the vehicle 10 after taking into account possible changes in the diameter and length of the HP gas tank.

Figure 7:
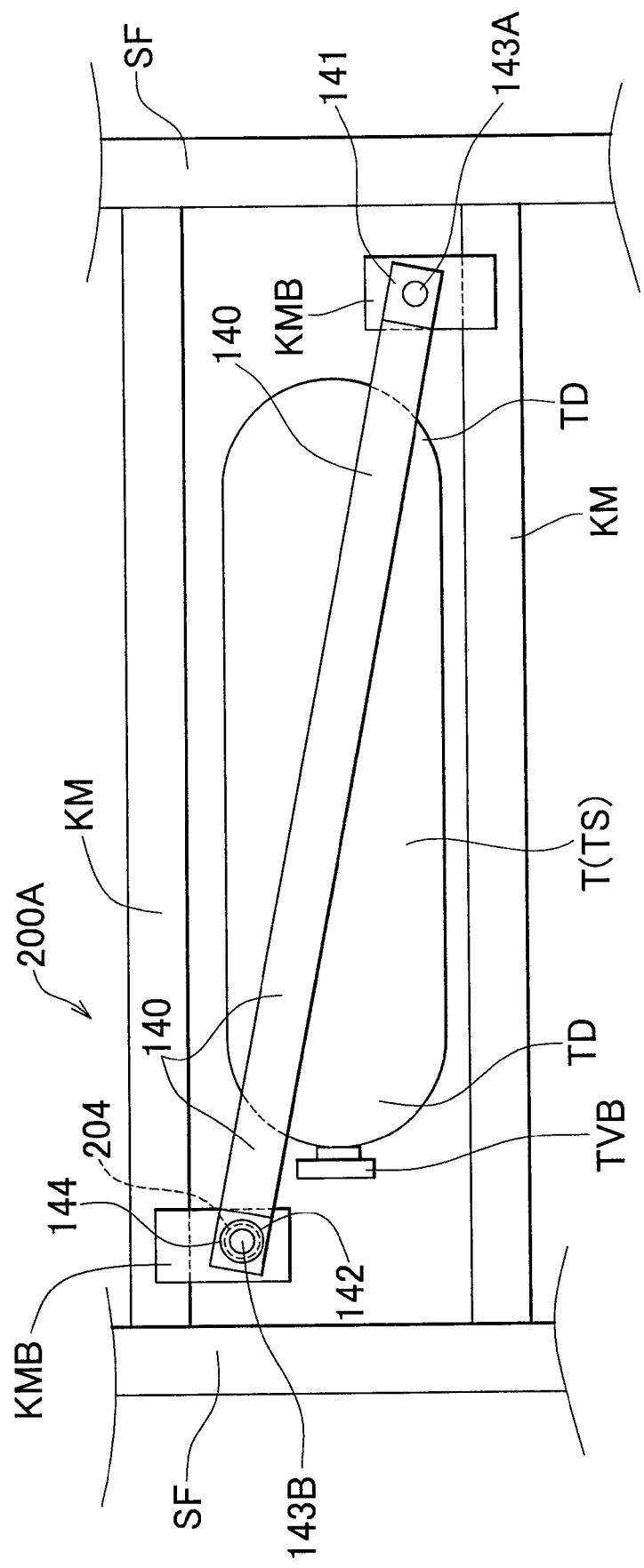
FIG. 7 is a view, which corresponds to FIG. 5B, showing the manner in which the HP gas tank is held by a tank holding mechanism according to an alternative embodiment.

The invention is not limited to the embodiment described above, and may be implemented in various other embodiments within the scope of the invention. FIG. 7 shows the manner in which the HP gas tank T is held by a tank holding mechanism 200A according to a modified, alternative embodiment. FIG. 7 corresponds to FIG. 5B.

As shown in FIG. 7, in the tank holding mechanism 200A according to the modification, cross members KM are provided to connect the side frames SF on the respective sides of the HP gas tank T to each other, and band holding brackets KMB extend from the respective cross members KM. The first secured end 141 and the second secured end 142 of the tank band 140 are secured to the band holding brackets KMB so that the HP gas tank T is held by the tank band 140 as described above. According to the modification, it is possible to obtain the same effects as those obtained in the embodiment described above. Members that are provided near opening ends of the tank housing recess 110 and that extend in the longitudinal direction of the vehicle 10 may be used as the cross members KM, and the tank band 140 may be secured to these members directly or via the band holding brackets KMB.

Figure 8:
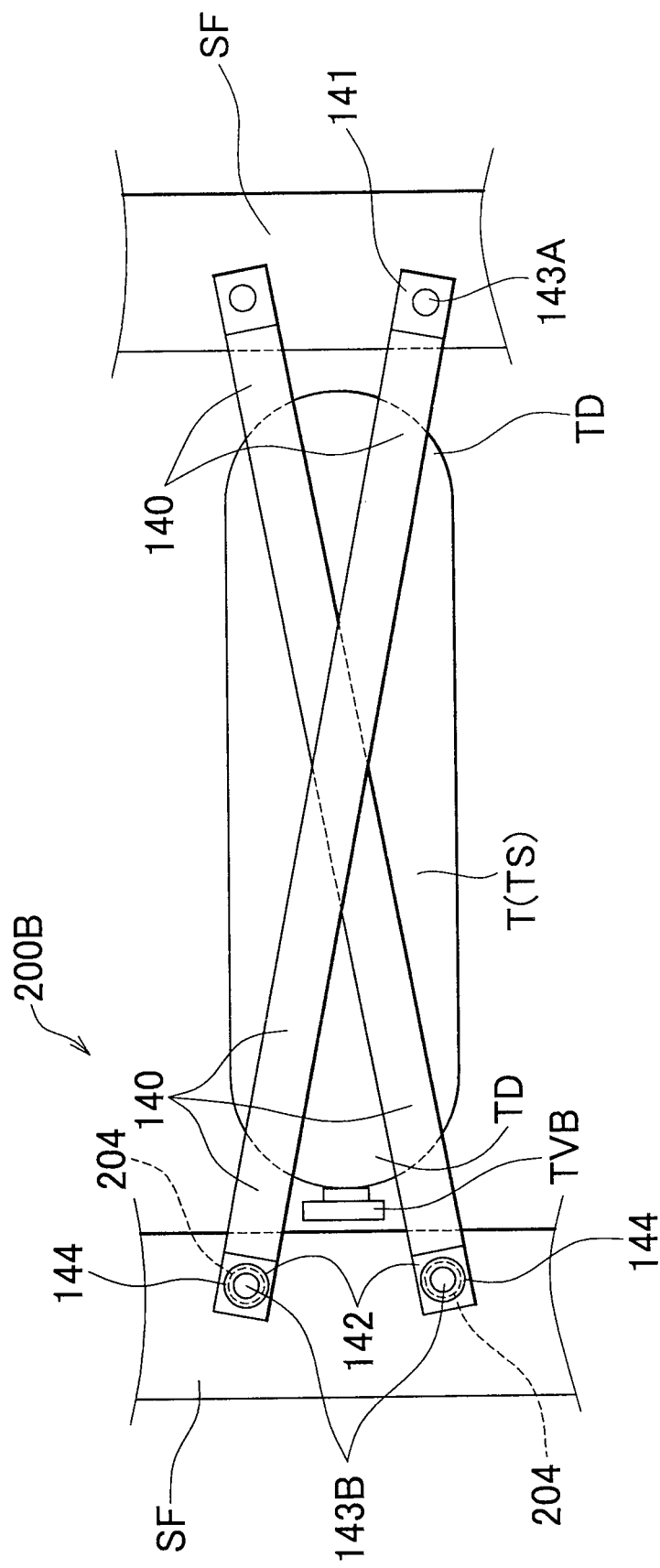
FIG. 8 is a view, which corresponds to FIG. 5B, showing a tank holding mechanism according to another alternative embodiment.

FIG. 8 is a view showing a tank holding mechanism 200B according to another modified, alternative embodiment. FIG. 8 corresponds to FIG. 5B. In the tank holding mechanism 200B according to this modification, two tank bands 140 are provided. The two tank bands 140 cross each other on the outer face of the cylindrical portion TS, and the tank bands 140 are secured to the side frames SF. With the tank holding mechanism 200B according to this modification, it is possible to more reliably keep holding the HP gas tank T in an appropriate position even if an axial force is applied to the HP gas tank T. This is because the cylindrical portion TS of the HP gas tank T is held by the tank bands 140 that cross each other, and each of the domical portions TD is held by the tank bands 140 that forms a V-shaped when viewed in the axial direction of the HP gas tank T. In addition, providing two tank bands 140 does not hinder space saving.

It will be apparent to those skilled in the art that various modifications and variations can be made to the structure described herein. Thus, it should be understood that the invention is not limited to the subject matter discussed in the specification. Rather, the present invention is intended to cover modifications and variations.

What is claimed is:

1. A tank holding mechanism for holding a gas tank that has a cylindrical portion and a pair of hemispherical-shaped domical portions formed on respective sides of the cylindrical portion, comprising:
    a tank accommodating portion configured to contact a peripheral wall of the cylindrical portion of the gas tank;
    tank end-side members configured to be provided near respective ends of the gas tank;
    at least one tank band configured to push the gas tank against the tank accommodating portion, wherein the tank band is further configured to be routed from one of the domical portions through the cylindrical portion to the other domical portion, with the tank band extending along a diagonal line of the gas tank on an outer face of the cylindrical portion, conforming to the outer face of the cylindrical portion, and conforming to hemispherical outer faces of both of the domical portions; and
    band securing portions configured to secure end portions of the tank band to the respective tank end-side members.

2. The tank holding mechanism according to claim 1, wherein the tank band is configured to be routed from one of the domical portions through the cylindrical portion to the other domical portion along a direction of reinforcement fibers that are helically wound around the gas tank.

3. The tank holding mechanism according to claim 1, wherein:
    the at least one tank band includes two tank bands;
    the two tank bands cross each other on the outer face of the cylindrical portion; and
    the tank bands are secured to the tank end-side members by the band securing portions.

4. The tank holding mechanism according to claim 1, wherein at least one of the band securing portions positioned at a respective end of the tank band is configured to secure the corresponding end of the tank band to the corresponding tank end-side member while absorbing a force that acts to expand the tank band.

5. The tank holding mechanism according to claim 1, wherein:
    the tank accommodating portion has a front securing seat and a rear securing seat that extend in a lateral direction of a vehicle and that face each other in a longitudinal direction of the vehicle; and
    the gas tank contacts the front securing seat and the rear securing seat.

6. The tank holding mechanism according to claim 1, wherein the tank accommodating portion is configured to be positioned over the gas tank.

7. The tank holding mechanism according to claim 1, wherein the tank band intersects with an axis of the gas tank at the cylindrical portion of the gas tank, when viewed from under the gas tank.

8. A vehicle, comprising:
    a gas tank transversely mounted with a longitudinal direction of the gas tank substantially coinciding with a lateral direction of the vehicle; and the tank holding mechanism according to claim 1, wherein the tank accommodating portion of the tank holding mechanism is positioned over the gas tank in a vehicle-height direction.

9. A gas tank holding system, comprising:
a gas tank having a cylindrical portion and a pair of hemi-spherical-shaped domical portions formed on respective sides of the cylindrical portion;
a tank accommodating portion configured to contact a peripheral wall of the cylindrical portion of the gas tank;
tank end-side members configured to be provided near respective ends of the gas tank;
at least one tank band routed from one of the domical portions through the cylindrical portion to the other domical portion, the tank band extending along a diagonal line of the gas tank on an outer face of the cylindrical portion, and conforming to the outer face of the cylindrical portion and hemispherical outer faces of both of the domical portions; and
band securing portions configured to secure end portions of the tank band to the respective tank end-side members;
wherein the tank band pushes the gas tank against the tank accommodating portion.

* * * * *